United States Patent [19]

Bauer et al.

[11] 3,868,095
[45] Feb. 25, 1975

[54] TORCH CUTTING APPARATUS

[75] Inventors: Helmut Bauer, Frankfurt/Main; Rudolf Stanzel, Ranbenberg, both of Germany

[73] Assignee: Messer Griesheim GmbH, Frankfurt am Main, Germany

[22] Filed: July 17, 1973

[21] Appl. No.: 379,959

[30] Foreign Application Priority Data
July 27, 1972  Germany............................ 2236821

[52] U.S. Cl. .......................... 266/23 K, 266/23 M
[51] Int. Cl. ............................................ B23k 7/02
[58] Field of Search.. 266/23 R, 23 C, 23 F, 23 HH, 266/23 K, 23 L, 23 M, 23 P, 23 T; 239/424.5, 543

[56] References Cited
UNITED STATES PATENTS

| | | | |
|---|---|---|---|
| 1,359,128 | 11/1920 | Trost................................. | 239/543 |
| 1,947,755 | 2/1934 | Bucknam et al................. | 239/543 X |
| 2,184,561 | 12/1939 | Babcock et al. ................. | 266/23 M |
| 2,412,281 | 12/1946 | Mott et al. ....................... | 266/23 M |
| 2,521,669 | 9/1950 | Rountree.......................... | 266/23 M |
| 2,574,100 | 11/1951 | Gettys et al...................... | 266/23 K |
| 2,665,900 | 1/1954 | Begerow........................... | 266/23 M |

FOREIGN PATENTS OR APPLICATIONS

| | | | |
|---|---|---|---|
| 126,958 | 0/1932 | Austria............................. | 266/23 R |
| 760,061 | 0/1956 | Great Britain ................... | 266/23 K |
| 808,534 | 0/1959 | Great Britain ................... | 266/23 R |

*Primary Examiner*—Roy Lake
*Assistant Examiner*—Paul A. Bell
*Attorney, Agent, or Firm*—Ernest F. Marmorek

[57] ABSTRACT

A torch cutting apparatus for high precision cutting including cutting under an angle in which the burner is supported at the region of its nozzle.

8 Claims, 5 Drawing Figures

PATENTED FEB 25 1975

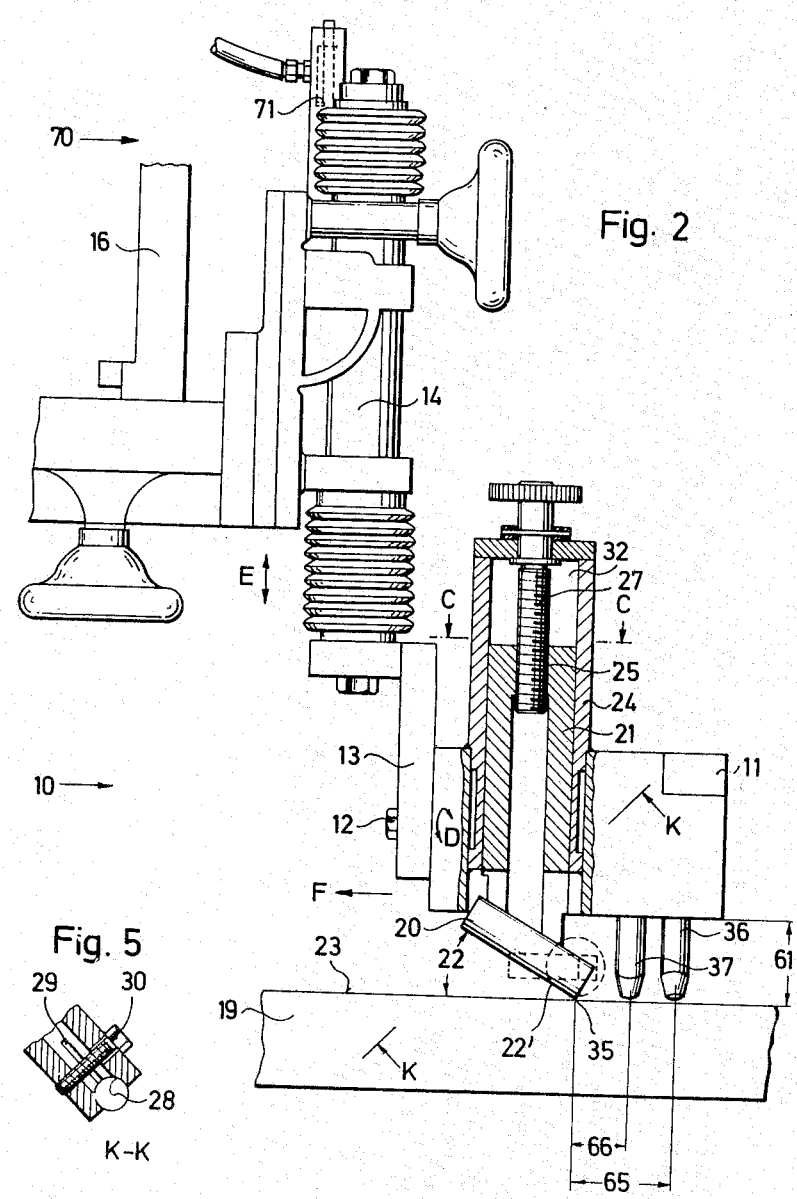

TORCH CUTTING APPARATUS

FIELD OF THE INVENTION

The present invention relates to an apparatus for torch cutting in the form of a torch cutting aggregate in which at least one cutting torch is arranged transversely with respect to the direction of cutting.

BACKGROUND OF THE INVENTION

In automated torch cutting with a fixed cutting apparatus it is important that the torch cutting device is guided in a possibly constant position over the work piece to be cut in order to be able to perform a precision cutting having tolerance within 0.2–0.5 mm. Especially when working with a single cutting torch having a nozzle positioning angle according to DIN 2,310 with respect to the workpiece and with which slanted cuts are performed in a process of preparation of the welding edges, such as for a K, X, or Y weld, it is important that the cutting torch, with respect to the angular position of the cutting aggregate, could be exactly positioned. Only then is it possible that, for example, in the process of a torch cutting for an X weld edge preparation an angle thread as well as the point of intersection of both angles of flank with respect to the upper surface of the workpiece or with respect to lower edge, will not change.

The accuracy of the torch cutting is especially important in the case of plates in which a portion of the welding seam lies in an overhead position, such as in the case of MIG/MAG welding processes, while the other portion of the welding seam becomes finished from above, such as in the case of the submerged arc welding process according to German Pat. No. 1,627,569. It has been found that in the event of overhead welding a certain critical welding puddle cannot be exceeded, therefore, it is essential, that the edge preparation is performed within strict tolerance limits, such as +0.2 mm.

So far welding edge preparations have been performed by the so-called multi-burner aggregates, such as described in German DAS Pat. No. 1,552,857. The multi-burner aggregates consist usually of three burners assembled into a single burner aggregate. The burner itself consists of a burner shaft pipe and of a burner nozzle which is screwed into the pipe of the shaft. In this multi-burner aggregate the burner shaft pipes are coupled with the aggregate itself. This has a disadvantage in that the burner portion which projects out of the aggregate is relatively large and the slight displacements which occur, for example, due to the relative shaking between the shaft pipe and the aggregate itself, will give rise to relatively large displacements of the burner nozzle itself. Furthermore, it is a disadvantage that when the nozzle is changed, the direction of the cutting flame stream which defines the angle of flank becomes also changed due to the thread play as well as due to certain manufacturing tolerances of the nozzle itself.

SUMMARY OF THE INVENTION

It is, therefore, an object of the present invention to provide an improved torch cutting apparatus of the above-described type which is capable of performing high precision cutting operations within narrow tolerances.

According to the present invention the cutting torch or burner is secured within the burner aggregate in the region of the nozzle. As a result, one will attain an exact positioning and a secure attachment of the burner, especially on the burner nozzle. Manufacturing tolerances in the threaded assembly between the nozzle and the burner shaft pipe will have no influence on the exit direction of the cutting flame stream and, thereby, will not cause any change in the angle of flank.

According to the present invention, an eccentric bushing is provided which surrounds the nozzle of the cutting burner and the invention also provides that the eccentric bushing and the burner nozzle can be reliably clamped within the burner aggregate. The eccentric bushing is journalled preferably in a rotatable fashion. This has the advantage that the exit angle of the cutting flame stream coming from the nozzle can be aligned with the axis of symmetry of the nozzle and of the receiving aperture for the eccentric bushing.

According to a further aspect of the present invention, the eccentric bushing as well as its receiving aperture within the burner aggregate are provided with at least one longitudinal slot. As a result, the burner nozzle can be clamped into place with the help of a single bolt connection.

BRIEF DESCRIPTION OF THE DRAWINGS

The invention will become more readily apparent from the following description of a preferred embodiment thereof shown, by way of example, in the accompanying drawings, in which:

FIG. 2 is a view, partly in section, in the direction of the arrow A in FIG. 1;

FIG. 5 is a sectional view along the line K-K in FIG. 2.

DESCRIPTION OF THE PREFERRED EMBODIMENT

Figure 1:
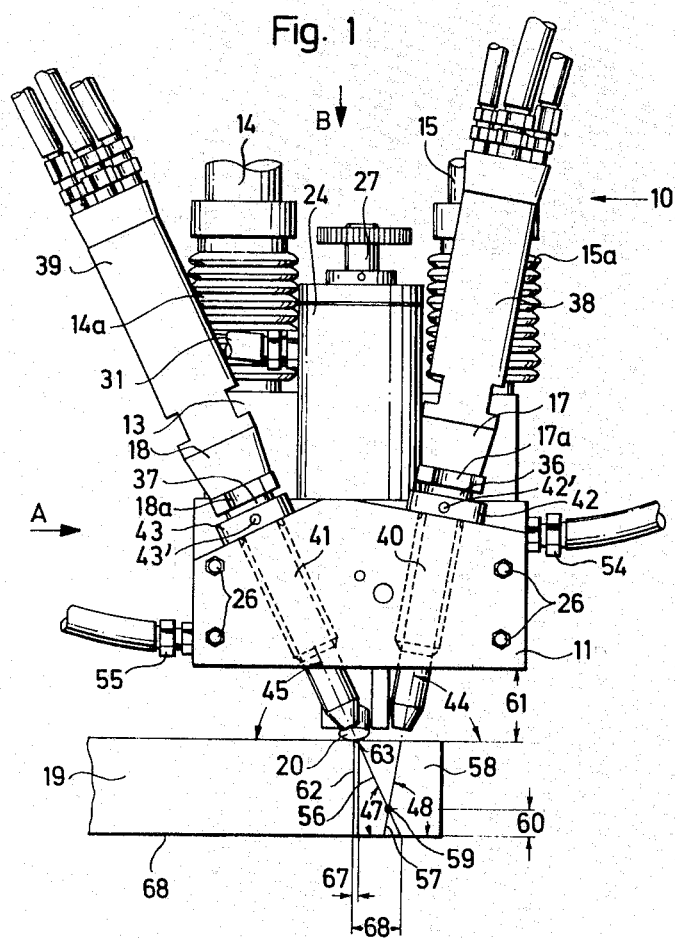
FIG. 1 is a schematic illustration of the burner assembly according to the present invention.

With reference to the Figures, the burner aggregate is identified by 10 and includes block 11 which can be pivoted on a support 13 in the direction of D and is secured thereto by bolt 12. The support 13 is connected with a pair of knee-joint rods 14 and 15 which are surrounded respectively by a pair of spring-like bellows 14a and 15a for dust protection. The support 13 is further connected with a burner carriage 16 (which is illustrated only schematically) which is the carriage for a fixed torch cutting apparatus well-known in the art and, therefore, this is not illustrated in detail here and is movable in an up and down movement (arrow E). With the help of the rods 14 and 15, the support 13 and the burner block 11 can easily be adjusted to an optimum height.

Within the burner block 11 there are provided a pair of cutting burners 17 and 18 as well as, according to the present invention, in the immediate vicinity of the cutting burners 17 and 18 a landing or sliding skid 20 is provided which, during the cutting operation abuts or lies over the working piece. Under the term "immediate vicinity" one should understand that the skid 20 is removed only by a few millimeters from the cutting burners 17 and 18 and only removed by a few millimeters, preferably 4–8 mm, abuts onto the workpiece at the slant cutting edge facing the burner.

A preferred construction and support of the skid 20 is illustrated in FIG. 2. The skid 20 consists of a pin made from wolfram and which is connected with the support 21 in such a fashion that it is inclined with respect to the upper surface 23 of the workpiece 19 under an acute angle 22 which has the approximate magnitude of 30°. The acuteness 22' of the angle 22 is pointed opposite to the advancing direction F of the burner apparatus. Due to this arrangement, the pin or skid 20 will not go into oscillations in the directions of the arrow F, when it is being pulled along and will not produce any chatter marks on the upper surface 23 of the workpiece 19.

Figure 4:
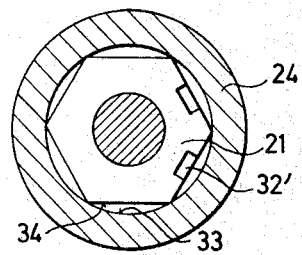
FIG. 4 is a sectional view along the line C—C in FIG. 2.

The pin support 21 is set into a cylinder 24 which is welded fixedly to the burner block 11, however, the support 21 is axially slidable and is made in the form of a hexagonal cross-section as can be seen in FIGS. 4 and 5. At the end, lying opposite to the upper surface 23 of the workpiece 19, the support 21 is provided with a threaded bore 25 which is threadedly coupled with a spindle 27 rotatably journalled in the cylinder 24.

In the supporting region lying opposite to the threaded bore 25 there is provided a slanted bore 28 for receiving therein the skid 20. The slanted bore 28 is provided with a slot 29 which, by means of a bore 30 provides a clamping connection for securing fixedly the skid 20 within the support 21, as shown in FIG. 5.

The support cylinder 24 is provided with a supply conduit 31 for a cooling medium, preferably pressurized air. The supplied pressurized air streams into the space 32 and then, over a hollow space 32', as shown in FIG. 4, provided between the cylinder inner surface 33 and the outer sleeve 24, against the skid 20. As a result, the skid 20 is constantly bathed by the pressurized cooling air and, thereby, the service time of the skid 20 is preferably supported between the support 21 in such a manner that the skid portion 35 which lies against the workpiece upper surface 23 lies approximately below the exit opening of the hollow space 32'. As a result, the region of the skid 20 which is exposed to the largest amount of heat becomes sufficiently cooled.

Each cutting burner 17 and 18 consists of a burner shaft pipe 38 and 39, respectively, which, by means of supply conduits indicated broken off, are supplied with oxygen and burner gas. Within the burner shaft pipe 38 and 39 by means of bolt connections 17a and 18a, the burner nozzles 36 and 37 are secured. The cutting burners 17 and 18 are preferably secured in the region of the nozzles 36 and 37 within the burner aggregate 10. As a result, an exact positioning and rattle-free securing of the burners 17 and 18 is obtained especially with respect to the individual nozzles 17 and 18 themselves. The burner portion or nozzle portion which projects out of the burner aggregate 10 is reduced to a minimum by the fact that the burners 17 and 18 are not clamped at their shaft portions 38 and 39 as was the case of prior art burner means pointed out above.

Within the burner aggregate 10 and more particularly within the burner block 11 there are provided eccentric bushings 40 and 41 for surrounding the respective nozzles 36 and 37. The nozzles 36 and 37 are formed as block or ring nozzles and have a relatively large length which is about 100 mm. Such a length of the nozzles makes it possible that the nozzles 36 and 37 can be clamped on a relatively large length. The eccentric bushings 40 and 41 are journalled in the burner block 11 in a rotatable fashion and on their end portions, lying opposite to the workpiece 19, they are provided with a coupling means 42 and 43 having pin apertures 42' and 43' provided therein.

By the rotatable journalling of the bushings 40 and 41, by applying a tool to apertures 42' and 43', one attains that the burner nozzle which is placed into the respective eccentric bushing can be rotated in such a fashion that the angles of flank 47, 48, respectively, for both of the cutting gas torches can be changed with respect to each other in order to compensate for manufacturing tolerances of the receiving apertures 49 and 50 in the burner block 11 and of the cutting nozzles 36 and 37 themselves.

Figure 3:
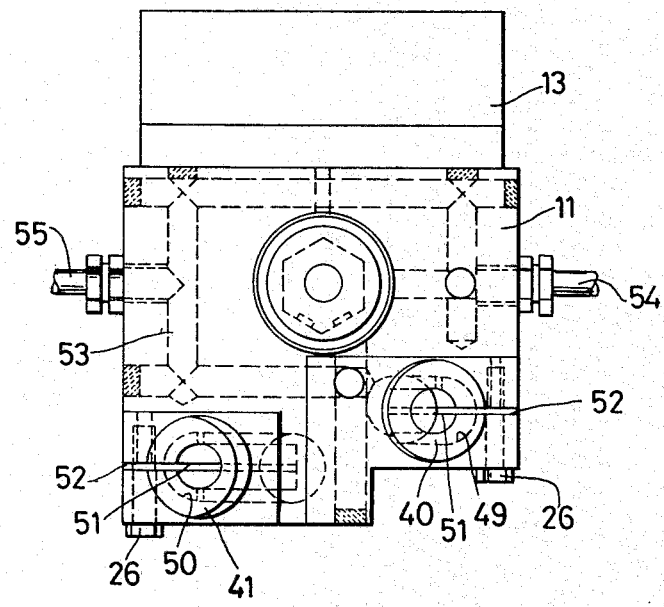
FIG. 3 is a view in the direction of the arrow B in FIG. 1.

As can be seen in FIG. 3, the eccentric bushings 40 and 41 as well as their receiving apertures 49 and 50 within the burner block 11 are provided with longitudinal slots 50, 52, respectively. One may provide several, such as three longitudinal slots 51 for each of the eccentric bushings. As a result, one attains that the eccentric bushings 40 and 41 and their corresponding burner nozzles 36 and 37 can be clamped securely into their operating position by means of a single bolt connection 26.

Within the burner aggregate 10 there are furthermore cooling channels 53 provided for a cooling medium which is supplied to the conduits 54 and 55 from a cooling medium source not shown in the drawings. The cooling medium which can be water, air or oil, for example, will provide sufficient cooling for the burner block 11 and, therefore, the nozzles 36 and 37 will have, thereby, increased their service life.

As can be seen in FIGS. 1 and 2, the skid 20 is provided or arranged directly before the burner nozzles 36 and 37 with respect to the cutting direction F and, is held at distance 65 with respect to the nozzle 36 amounting to about 40 mm, and at a distance 66 with respect to the nozzle 37 amounting to about 25 mm.

It is preferred in the event of burner aggregates having several cutting burners, that the skid 20 is placed between the nozzles 36 and 37 and, in such case, the distance 66 between the skid 20 and the nozzle 36 will be about 20mm and the distance 67 between the skid 20 and the nozzle 37 will be then about 5mm.

The above described arrangement assures that, notwithstanding a change in the upper surface of the workpiece, in the region of the cutting, the distance between the cutting nozzles 36 and 37 with respect to the upper surface 23 of the workpiece 19 remains constant.

In the illustrated embodiment, the cutting nozzle 36 is set at a nozzle angle position 44 of 80° and the cutting nozzle 37 is set at a nozzle positioning angle 45 of 65° with respect to the vertical within the burner block 11. By means of the nozzles 36 and 37 two slant cuts 56 and 57 are made within the workpiece 19 which, in the illustrated embodiment, can be a ship building plate having a thickness of about 8–45mm. Such slanted cut can be made in the process of edge preparation for an X weld. At 58, the strip of material is indicated which is cut-off from the workpiece 19.

As has been indicated above, it is important that the point of intersection 59 of both slant cuts 56 and 57, with respect to its distance to the upper surface 23 of the workpiece 19 and the lower side 68 of the workpiece, should remain constant. Before the beginning of the cutting operation, independence from the thickness of the plate or workpiece 19 and independence from the predetermined distance 60 of the point of intersection 59 from the lower side 68, the height 61 between the burner block 11 and the upper surface 23 is set by means of the spindle 27 and the skid 20. The invention provides that the skid 20 is arranged in the vicinity of the cutting burners and during the cutting operation it follows a line 62 which runs parallel with respect to the upper edge 63 of the cut. The distance between line 62 and the upper edge 63 amounts to a few millimeters, and in the illustrated embodiment it is about 5mm. Due to the close arrangement of the skid 20 to the burners, the upper edge 63 will follow indirectly through the cutting burners any changes in the upper surface 23 of the workpiece 19. The distance remains constant and the slant cuts 56 and 57 will experience, at the set distance 60 and at the given position angles, only a slight play.

In order to prevent that at the end of the cutting operation when the skid 20 leaves the upper surface 23 of the workpiece 19, the burner would suddenly drop-off, the rod guides 14 and 15 are preferably coupled with a blocking arrangement 70. The blocking arrangement 70 includes, for example, a membrane 71 which is pressed onto the rods 14a of the guides 14 and 15 by means of some kind of pressure, such as by a spring, or by pressurized air.

Such blocking or preventing arrangement 70 is also advantageously employed during the set-up of the overall apparatus, especially when a plate simultaneously must be provided with an edge preparation on both sides and the burner aggregate must be set-up sequentially at predetermined distances with respect to the upper surface of the workpiece. In this case, first one of the burner aggregates is set-up and then fixed in the set position. Thereafter, the second burner aggregate is set-up without the necessity of any change in the other aggregate even after it has passed through the operation. The blocking arrangement 70 can be operated manually or by a switching cam arrangement which can be set automatically after the cutting has been performed so that it would operate at the end of the cutting process.

The apparatus, according to the present invention, finds particularly advantageous applications in the case of multi-burner aggregates, such as a three burner aggregate.

It is within the scope of the present invention, however, that the apparatus be also applicable to welding or cutting apparatus which operate with a single or several cutting or welding burners.

In the above described embodiment, the skid 20 has been described as a pin made from wolfram. It is, however, within the scope of the present invention, to provide other kinds of forms for the skid 20, such as the form shown in FIG. 2 by the dashed line. The skid 20 can be made also from a ceramic sintered metal with a thickness of about 5mm. The skid 20 is secured in its place, then, by means of a bolt.

For conventional elements, reference should be had to the above-mentioned two patents.

I wish it to be understood that I do not desire to be limited to the exact details of construction shown and described, for obvious modifications will occur to a person skilled in the art.

Having thus described the invention, what we claim as new and desire to be secured by Letters Patent, is as follows:

1. In a torch cutting apparatus, the combination of at least two cutting burner means including each a cutting nozzle device, and means for supporting and mounting said cutting nozzle, devices at an angle with respect to each other and with respect to an upper surface of a workpiece and thereby adapting said cutting nozzle devices for bevel cutting an edge of said workpiece, wherein said supporting means comprises a nozzle block including at least two receiving bores arranged at a fixed predetermined angle in said nozzle block.

2. The combination as claimed in claim 1, wherein said mounting means includes eccentric bushing means surrounding said nozzle devices and means for clamping said nozzle devices in an operational position within said cutting burner means, in the region of the outlet of said nozzle device in said receiving bore.

3. The combination as claimed in claim 2, including means for rotatably mounting said eccentric bushing means in said cutting apparatus.

4. The combination as claimed in claim 3, wherein said mounting means for said eccentric bushing means includes a receiving bore for each nozzle device formed in said burner apparatus, including a longitudinal slot, and means for providing for the clamping securing of said nozzle devices in the respective eccentric bushing means in cooperation with said slot.

5. The combination as claimed in claim 4, wherein said mounting means comprises a bolt means for clamping said nozzle devices in said eccentric bushing means.

6. The combination as claimed in claim 1, cooling passages provided in said supporting block means for guiding cooling mediums to said nozzle devices.

7. The combination as claimed in claim 1, including a mounting block means, a guiding skid means, means adjustably supporting said skid means in said mounting block means for slidably guiding said nozzle devices during the cutting operation over a workpiece, and means for adjusting the vertical elevation of said nozzle devices with respect to an upper surface of the workpiece.

8. The combination as claimed in claim 7, wherein said skid supporting means includes means for guiding a cooling medium to said skid means.

* * * * *